Figures 1, 2, 3, 4, 5:
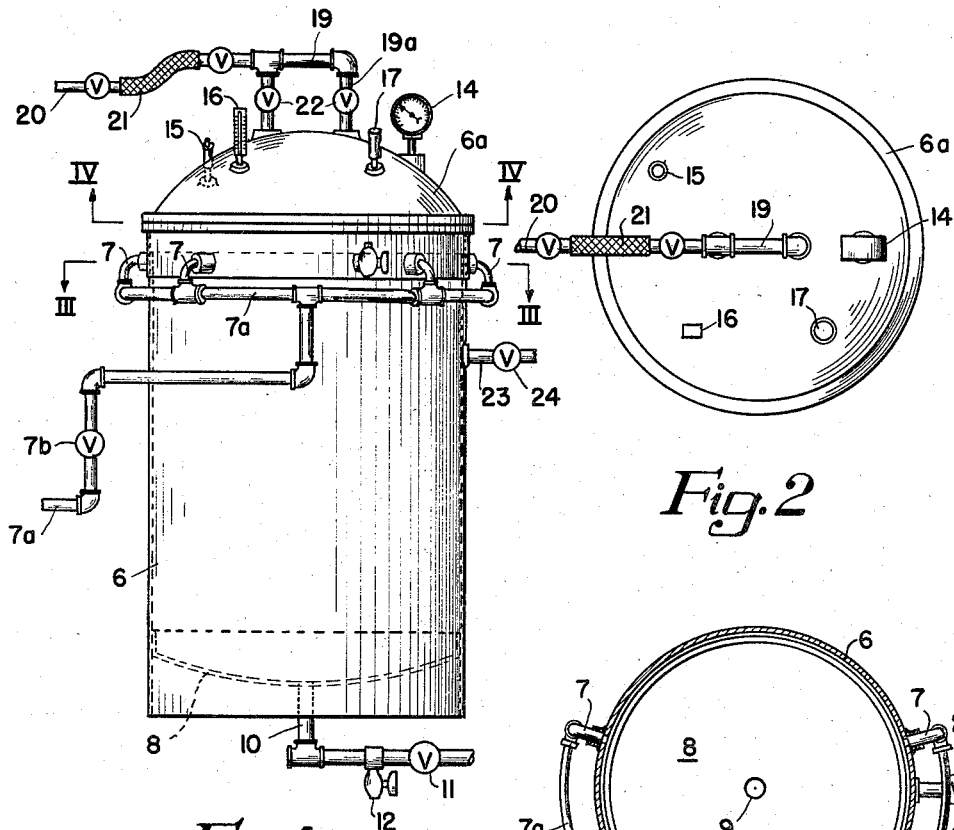

INVENTOR
Karl L. Ford.
by Green McCallister Miller
his ATTORNEYS.

Patented May 29, 1951

2,555,230

UNITED STATES PATENT OFFICE 2,555,230

PRESSURE COOKING PROCEDURE

Karl L. Ford, Muncie, Ind., assignor to Ball Brothers Company Incorporated, Muncie, Ind., a corporation of Indiana Application October 14, 1948, Serial No. 54,402

8 Claims. (Cl. 99—214)

This invention relates to the processing of food and similar materials in the operation of preserving them, and particularly to food processing procedures wherein the processing or cooking is accomplished at super-atmospheric pressures.

An object of the invention is to produce a new procedure which supplements the food processing operation and contributes to the effective sealing of the jars or containers in which the food material is located during the processing operation and in which such material is retained under hermetic seal after the processing is completed.

Pressure cooking of foods for the purpose of preserving them has been employed for some time in connection with both domestic and commercial food preserving operations. Within the last few years "community canning" has been practiced in a number of communities and as a result home canning operations have been developed or extended along lines of commercial procedures. That is to say, community canning has made it economically feasible to employ relatively large retorts in which the food cooking operations are carried forward. These retorts are of such size that they will receive a large number of containers. They are so equipped that steam under pressure is delivered to them after the food filled containers are in place therein, and constitutes the heating or processing medium.

From the foregoing it is apparent that community canning operations are carried forward under conditions which are comparable to some extent with conditions encountered in the commercial processing of foods. Glass jars such as are generally termed "domestic fruit jars" may be, and usually are employed in community canning operations. The food to be processed is packed in such jars or other containers and the closures for the containers are applied in such a way that each container is loosely sealed. The pre-packed containers are then loaded into the retort, the retort is closed and the processing is started by the delivery of steam under pressure to the interior of the retort and generally under conditions such that the air within the retort is evacuated and replaced by the incoming steam. Air removal from the retort is best accomplished by delivering the steam into the upper portion of the retort while a drainage aperture at the bottom of the retort is fully open. If excessive turbulence is avoided, the hot, and consequently relatively light steam entering the retort, tends to float on or remain above the colder and consequently heavier air within the retort. Under such conditions, the incoming steam forces the air downwardly and out through the drainage vent, thus providing a substantially air-free steam atmosphere within the retort.

As the incoming steam contacts the cold surfaces within the retort, considerable condensation takes place. The drainage aperture at the bottom of the retort, therefore, is usually retained open throughout the initial heating up period so that this initially formed condensate is discharged from the retort. After a substantially uniform temperature has been obtained within the retort, condensation is greatly reduced and the drainage aperture is closed, but a leak-off vent is left open at the bottom of the retort in order to provide circulation and to discharge from the retort such air as may be vented from the jars or containers during the processing operation.

At the end of the processing period, the steam supply to the retort is shut off and a spray of cooling water may be delivered into the retort immediately after the delivery of steam has been discontinued. It has also been the practice to offset the rapid reduction of pressure within the retort occasioned by the introduction of the spray of cooling water, by simultaneously admitting air under pressure to the interior of the retort and in this way retaining processing pressure within the retort at least throughout some portion of the water cooling operation. The reason for this is that a premature vacuum in the retort chamber may occasion a loss of liquid from the food filled containers within the retort. That is to say, a reduction in retort pressure prior to a corresponding reduction in pressure within the retort-enclosed containers, will cause or tend to cause a leakage of liquid from the containers.

In this connection, I note that I employ the term "loosely sealed" as applied to food-filled containers, to denote a relationship between each container and its closure such that the closure in effect will function as a check valve in response to variations in pressure encountered, in that it will permit liquid, air or other fluid and also vapor and steam to pass out of the container when the pressure therein exceeds external pressure, i. e., pressure within the retort chamber, but will prevent a reverse flow into the container when the external pressure exceeds that within the container.

A specific object of my present invention is to produce a procedure which insures the positive sealing of "loosely sealed" containers at the end of the processing operation and while the containers are located in place within the processing chamber of the retort.

In the accompanying drawings, I have illustrated somewhat diagrammatically apparatus for carrying forward the procedure constituting my invention.

Figure 1 is a side elevation of such apparatus.
Figure 2 is a top plan view of the apparatus shown in Figure 1.
Figure 3 is a sectional view along the lines III—III of Figure 1.
Figure 4 is a sectional view along the lines IV—IV of Figure 1; and
Figure 5 is a sectional view along the lines V—V of Figure 4.

As shown, the retort is formed in two parts, viz., the body portion 6 and a closure or cover portion 6a. For convenience of illustration I have omitted the clamping means usually employed for securing the cover in place on the body of the retort but it will be understood that the cover is so secured to the body portion that the interior of the retort is capable of being subjected to a substantial pressure above atmospheric pressure. Steam is admitted to the interior of the retort through a series of nozzles 7 which are spaced around the body portion 6 and are located adjacent the upper edge thereof. Steam is delivered to these nozzles through piping 7a from any suitable source of steam maintained at a predetermined pressure. The piping 7a is provided with a control valve 7b for the purpose of controlling the rate of steam flow to the control valve 7b and also the steam pressure within the retort chamber.

The steam nozzles are so arranged and so spaced around the upper portion of the retort that steam initially delivered to the retort will enter the upper portion thereof with a minimum amount of turbulence, thus contributing to the removal of air from the retort. The bottom of the retort is of spherical form and is provided with a drainage port 9 located at the central and lowest point within the retort chamber. Piping 10 communicates with the port 9 and is provided with a valve 11 (preferably a globe valve) and also a pet cock 12 so arranged that when the valve 11 is closed and the pet cock is open, it provides a leak or vent aperture at the bottom of the retort.

The cover of the retort is shown as provided with a pressure gauge 14, a safety valve 15, a thermometer 16, and an adjustable vent valve 17. The cover also is equipped with adjustable spray nozzles 18 which are illustrated in Figures 4 and 5. Each spray nozzle receives cooling water from piping 19 which communicates with a water spray pipe 20 through a section of hose 21. The piping 19 is provided with a branch pipe 19a which serves one of the nozzles 18. The piping 19 and the branch pipe 19a are each provided with a shut-off or control valve 22 and, as shown in Figures 4 and 5, two of the spray nozzles 18 communicate directly with the piping 19, whereas one communicates with the branch pipe 19a. Each spray nozzle is shown as secured to the end of a section of flexible pipe, the arrangement being such that the position of each spray nozzle may be adjusted so as to effectively direct water spray into the retort chamber. As shown in Figures 1 and 3, the body of the retort is provided with an air inlet port which communicates with air delivery piping 23. The piping 23 is shown as provided with a valve 24.

As a preliminary to loading the retort the cover 6a is removed. Pre-packed containers are located on trays and are loaded into the retort through the open top thereof. Usually the pre-packed containers are initially placed in a receptacle or crate which is so arranged that it may be readily handled by convenient apparatus and the loaded crate is moved into the retort. The manner of positioning the food packed containers within the retort is not critical, except that each container must be in an upright position when in place within the retort, i. e., each container must stand substantially vertically with the closure-carrying end thereof uppermost.

In carrying forward the procedure of my invention, the retort is loaded and the cover 6a is secured in place; the drainage valve 11 is opened and the valve 7b is opened, thus admitting steam to the top of the retort chamber through the steam nozzles 7. The flow of steam thus admitted is continued until the interior of the retort is heated to substantially processing temperature, thus evacuating the air from the retort and establishing a condition wherein a minimum amount of condensate is formed within the retort. The drainage valve 11 is then closed and the pet cock 12 is opened. The steam flow to the container is adjusted so as to maintain the desired processing pressure (and temperature) within the processing chamber of the retort and this may be accomplished by manipulating the valve 7b.

After the food within the retort has been subjected to processing temperature and pressure for a predetermined period of time, the valve 7b is closed. Prior to, or substantially simultaneously with the closing of the valve 7b I admit air to the processing chamber of the retort through the piping 23 at a pressure and in volumes such as to almost instantaneously raise the pressure within the retort from three to five pounds above the processing pressure. This increase in presure is accomplished as rapidly as possible, the intent being to approximate an impact force acting in all directions within the processing chamber. It will, however, be apparent that the air pressure so admitted does not increase the temperature within the retort, but actually tends to reduce that temperature. It, however, has a direct and important effect on the closure of each container located within the retort in that the impact-like increase in pressure acts like a mechanical sealing head, striking and forcing each closure (or the lid portion thereof) into its fully closed position with relation to its associated container.

As previously noted, each of the containers within the retort is loosely sealed. This manner of sealing each pre-packed container prior to processing the food within it permits the venting of the container as the pressure rises therein with the result that the pressure within each container approximates the processing pressure within the retort chamber. The almost instantaneous increase in pressure within the retort chamber, occasioned by the delivery of air under pressure to that chamber, however, does not occasion a change of pressure conditions within the containers due to the "check valve" action of the container closures. It, however, is highly effective as a closing force due to the differential pressure acting on each closure, and it holds each closure in the fully sealed position.

Cooling water may be admitted to the retort through the spray nozzles 18 simultaneously with or shortly after the introduction of the high pressure air into the retort. In either case the cooling step is in effect initiated by the closing of the steam valve 7b, but the admission of cooling water to the interior of the retort occasions a relatively rapid cooling of each container with a resultant condensing of the vapor within each container. This condensation occasions the formation of a vacuum or partial vacuum within the container which accentuates the sealing effect of the increased air pressure existing within the retort and creates a condition which contributes to the positive sealing of each container even after the containers are removed from the retort.

After the cooling of the contents of the jars has been carried to the desired temperature (at least as low as about 190° F.), the air inlet valve 24 is closed, the water sprays are shut off, the pressure within the retort is vented to the atmosphere by opening the valve 17, the retort is opened and the food packed containers are removed therefrom and set aside for further cooling or for transportation and storage.

In order that the check valve action of the closures of the loosely sealed containers may be understood, it is pointed out that any of the usual forms of closures may be employed wherein the closure includes a gasket which rests upon the lip around the mouth of the container or upon some other similar surface formed on the container and constitutes the sealing gasket between the container and the closure. With such a closure, the sealing of the container is at least partially effected by gravity when the gasket engages the supporting surface on the container and in turn supports the closure or the lid portion of the closure. Under such conditions any force which presses the lid, the gasket and the gasket-supporting surface of the container into intimate contact with each other, tends to perfect the seal between the closure and the container. In some closures the gasket is separately formed whereas in others it is carried by the closure or the lid portion thereof, but in either case, it functions in the manner described.

The gaskets are formed of resilient material such as rubber and in most cases they respond to the processing temperature by softening to some degree, but not enough to destroy their utility as gaskets. As a matter of fact, the softening which takes place contributes to the effective sealing and particularly where air pressure is employed in the manner here defined. The softening of the gasket together with the rapidly applied air pressure insures the sealing of each container and also makes it possible to accomplish an effective seal with gaskets which contain less material than those now in use. The gaskets may be the so-called cut gaskets, i. e., separately formed gaskets, or they may be of the type which are applied to the closure lid while in a plastic state. Both forms of gasket are rendered highly effective by my invention.

In delivering cooling water to the processing chamber, care must be taken to maintain the delivery in the form of a fine spray, i. e., a spray approximating a heavy mist. Slugs of cold water contacting the hot jars are almost certain to cause breakage where glass jars are employed. Care should also be taken at the time of admitting steam to the processing chamber in order to avoid subjecting the then cold jars to the action of slugs or substantial quantities of hot water which may be discharged from the steam pipe in advance of the oncoming steam.

The processing operation involved by my invention is usually carried forward at a temperature of about 240° F. This means that the steam pressure within the retort chamber is about 10 pounds above atmospheric during the processing operation. The cooling period is initiated by delivering compressed air to the retort under conditions such as to raise the pressure therein to about 15 pounds above atmospheric pressure or about 5 pounds above processing pressure. This rise in pressure is substantially instantaneous and the increased pressure is preferably retained within the retort chamber until cooling has been carried to the point where the pressure within each retort-enclosed container is reduced substantially below atmospheric pressure. It will, however, be apparent that some changes in procedural steps as to pressure and temperature conditions employed may be made without departing from the spirit and scope of my invention as defined by the appended claims. In the claims I employ the term "pre-packed container" to mean a container which is filled or partially filled with food as a preliminary to processing (cooking) such food, and I employ the term "loosely sealed" in the sense it has been previously employed herein, i. e., a positioning of the closure on the container such that the "check valve" action is obtained.

What I claim is:

1. A method of processing food, which consists in packing the food to be processed into separate containers, loosely sealing each such container, loading the loosely sealed containers into the processing chamber of a retort, maintaining each such container in a substantially upright position in the retort with the closure end thereof uppermost, closing the retort, delivering steam under pressure to the interior thereof, maintaining the interior of the retort under steam pressure while processing the food within the retort, delivering air under pressure to the interior of the retort and thereby raising the pressure therein substantially above the processing pressure, delivering cooling liquid into the retort while maintaining the interior thereof above the processing pressure, then venting the interior of the retort to the atmosphere and removing said containers.

2. A method of processing food to preserve the same, in which the food to be preserved is pre-packed in containers, the containers are loosely sealed and enclosed within a processing chamber, which comprises subjecting the food so packed and so enclosed to an atmosphere of steam maintained at the processing temperature and a corresponding pressure throughout a predetermined period; then delivering a non-condensable fluid into said chamber and substantially simultaneously shutting off the supply of steam to said chamber without decreasing the pressure therein; and then cooling the pre-packed food within the chamber while maintaining the pressure therein.

3. A method of preserving food in which the food to be preserved is pre-packed in containers and the containers are loosely sealed and enclosed within a processing chamber, which comprises delivering steam under pressure into said chamber and around the food so packed and enclosed; maintaining the steam so delivered at a processing temperature throughout a predetermined period; substantially simultaneously shutting off the supply of steam to said chamber and delivering a non-condensable fluid thereto at a pressure and in amounts sufficient to increase the pressure within the chamber above the steam pressure; then delivering cooling liquid into the chamber while maintaining such increased pressure therein; and then removing the containers from the chamber.

4. A method of preserving food and similar materials in which materials to be preserved are pre-packed in containers, the containers are loosely sealed and enclosed within a retort, which comprises subjecting the material so packed and so enclosed to an atmosphere of steam existing at a processing temperature; maintaining the temperature within the retort throughout a predetermined period; then shutting off the steam supply to said retort and substantially simultaneously delivering a non-condensable fluid into said retort at a pressure and in an amount sufficient to maintain the pressure therein at least as great as the pressure of the steam during such predetermined period; then subjecting the pre-packed material within the retort to cooling effect of cooling liquid while maintaining such pressure within the retort; and then venting the retort to the atmosphere and removing the containers from the retort.

5. A method of processing food and similar material to preserve the same, which comprises pre-packing material to be preserved in separate containers; fitting a closure to and loosely sealing each such container; placing such loosely sealed containers in a retort in an upright position with the closure thereof uppermost; subjecting the pre-packed material while in the retort to an atmosphere of steam; maintaining the steam at a processing temperature and corresponding pressure throughout a predetermined period; then delivering air under pressure to said retort and maintaining the processing pressure within the retort while subjecting the pre-packed material contained therein to a cooling medium, then venting the retort to atmospheric pressure and removing the processed food therefrom.

6. A method of processing food and similar material to preserve the same, which comprises pre-packing the material to be preserved in a number of separate containers, fitting a closure to and loosely sealing each such container; enclosing such loosely sealed containers in a retort, each in a substantially upright position with its closure uppermost; delivering steam under pressure to the interior of the retort and maintaining the steam within the retort at a processing temperature throughout a predetermined period; rapidly increasing the pressure within the retort above the processing pressure by delivering a non-condensable fluid under pressure to the interior of said retort; then cooling the pre-packed material within the retort while maintaining the increased pressure therein; and then removing such containers from the retort.

7. A method of processing food, which comprises pre-packing the food to be processed in separate containers; fitting a closure to and loosely sealing each such container; placing the containers so sealed into a processing chamber while maintaining each such container in a substantially upright position in said chamber with the closure thereof uppermost; closing the chamber; delivering steam under pressure to the upper portion of said chamber while simultaneously discharging the air within the chamber from the lower portion thereof; maintaining the steam within the chamber at a processing temperature throughout a predetermined period; substantially simultaneously shutting off the supply of steam to the chamber and delivering air under pressure into the chamber at a pressure such as to increase the pressure within the chamber above the processing pressure; then delivering cooling medium into the chamber while maintaining such increased pressure therein; then venting the chamber to the atmosphere and removing the containers therefrom.

8. A method of processing food to preserve the same, which consists in pre-packing the food to be preserved in separate containers; loosely sealing each such container; placing the loosely sealed containers in a processing chamber and maintaining each such container in a substantially upright position with the closure end thereof uppermost; delivering steam under pressure to said chamber and thereby replacing the air contained therein; maintaining the steam within the chamber at a processing temperature throughout a predetermined period; increasing the pressure within said chamber without increasing the temperature therein by substantially simultaneously cutting off the steam supply to said chamber and introducing a compressed air into the chamber at a pressure and in amounts sufficient to raise the pressure therein from 3 to 5 pounds above the processing steam pressure; delivering a spray of cooling liquid into the chamber while maintaining such increased pressure; and then venting the chamber to atmosphere and removing the containers therefrom.

KARL L. FORD.

REFERENCES CITED

The following references are of record in the file of this patent:

UNITED STATES PATENTS

| Number | Name | Date |
|---|---|---|
| 1,184,250 | Magrane | May 23, 1916 |
| 1,447,701 | White | Mar. 6, 1923 |
| 1,544,384 | Fenn | June 30, 1925 |
| 1,881,855 | Mullen | Oct. 11, 1932 |
| 2,144,334 | Kennedy | Jan. 17, 1939 |
| 2,388,103 | Whitaker | Oct. 30, 1945 |
| 2,398,082 | Cavallito | Apr. 9, 1946 |